(12) United States Patent
Wang et al.

(10) Patent No.: US 11,735,105 B2
(45) Date of Patent: Aug. 22, 2023

(54) DRIVING CIRCUIT FOR CONTROLLING POWER OF LIGHT-EMITTING ELEMENTS AND DRIVING METHOD THEREOF

(71) Applicant: Qisda Corporation, Taoyuan (TW)

(72) Inventors: Po-Wen Wang, Taoyuan (TW);
Tung-Hsien Tsai, Taoyuan (TW);
Wen-Hao Kuo, Taoyuan (TW);
Chin-Sheng Chueh, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/825,604

(22) Filed: May 26, 2022

(65) Prior Publication Data
US 2023/0230529 A1    Jul. 20, 2023

(30) Foreign Application Priority Data

Jan. 19, 2022  (CN) .......................... 202210060426.0

(51) Int. Cl.
*G09G 3/32*        (2016.01)

(52) U.S. Cl.
CPC ......... *G09G 3/32* (2013.01); *G09G 2320/029* (2013.01)

(58) Field of Classification Search
CPC ...................................................... G09G 3/32
USPC ......................................................... 345/102
See application file for complete search history.

(56) References Cited

U.S. PATENT DOCUMENTS

| | | | |
|---|---|---|---|
| 2013/0175934 A1* | 7/2013 | Fujita | H05B 45/14 315/186 |
| 2015/0305098 A1* | 10/2015 | Jung | H05B 45/44 315/122 |

* cited by examiner

*Primary Examiner* — Long D Pham (57) ABSTRACT

A driving circuit, a driving method and a display apparatus are provided. The driving method is provided for driving a light-emitting unit including a first light-emitting element series and a second light-emitting element series connected in parallel and connected to a processing unit and a driving unit of a driving circuit. The processing unit detects a first voltage value and a second voltage value. The driving unit detects and transmits a first current value and a second current value to the processing unit. The processing unit determines and compares a first power value and a second power value. When the first and second power values are different, the processing unit controls the driving unit to adjust a driving current setting of the light-emitting element series until the first and second power values are equal. The invention ensures luminance consistency of different light-emitting element series and the luminance uniformity of display apparatus.

15 Claims, 3 Drawing Sheets

Detecting the first voltage value at two ends of the first light emitting element series and the second voltage at two ends of the second light emitting element series by the processing unit; detecting the first current value flowing through the first light emitting element series and the second current value flowing through the second light emitting element series by the driving unit, and transmitting to the processing unit. — S110

Determining the first power value according to the first current value and the first voltage value, and calculating the second power value according to the second current value and the second voltage value by the processing unit. — S120

Comparing the first power value and the second power value by the processing unit; when the first power value being larger than the second power value, controlling the driving unit to adjust the driving current setting of the second light emitting element series by the processing unit, until the first power value being equal to the second power value. — S130

DRIVING CIRCUIT FOR CONTROLLING POWER OF LIGHT-EMITTING ELEMENTS AND DRIVING METHOD THEREOF

BACKGROUND OF THE INVENTION

1. Field of the Invention

The invention generally relates to a driving circuit and a driving method. Particularly, the invention relates to a driving circuit, a driving method and a display apparatus by applying the driving circuit to improve the luminance uniformity.

2. Description of the Prior Art

At present, the application of display apparatus is more and more popular. For liquid crystal display apparatus, it includes a liquid crystal panel and a backlight module. The backlight module includes a light-emitting diode (LED) bar, a light guide plate/a diffusor plate, and an optical film, etc. Since the liquid crystal panel cannot emit light by itself, the liquid crystal display apparatus achieves screen display by means of a backlight from the backlight module. People have higher and higher requirements for the performance of the display apparatus. Due to the inherent difference in the performance of various materials in the display apparatus, the inconsistency of screen luminance of liquid crystal display apparatus would be a problem that affects the user's experience. Because of process limitations, the luminance of each LED in the LED bar exists difference, which is one of the reasons for non-uniformity of screen luminance of the display apparatus.

Figure 1:
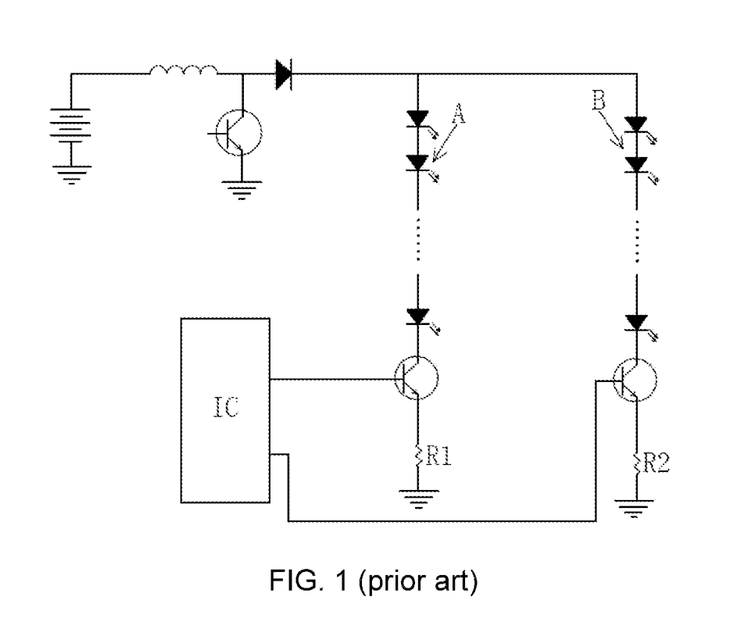
FIG. 1 is a schematic diagram of a conventional driving circuit.

In practical operation, differences in turn-on voltage exist between different LEDs. When a plurality of LEDs is connected in series to form a LED series, the difference in turn-on voltage becomes more significant between different LED series. In order to maintain the luminance consistency, the conventional control method adopts a constant current mode, which does not consider the differences in turn-on voltage of LED series. Referring to FIG. 1, FIG. 1 is a schematic diagram of a conventional driving circuit. Driving integrated circuit (IC) provides a fixed current value to a first LED series A' and a second LED series B'. The fixed current value is, for example, 120 mA. The turn-on voltage of the first LED series A' is 35V, and the using power of the first LED series A' is P_LEDA=35*0.12=4.2 W. The turn-on voltage of the second LED series B' is 33V, and the using power is P_LEDB=33*0.12=3.96 W. The difference of using power between the first LED series A' and the second LED series B' is 4.2-3.96=0.24 W. Converted to 165 lumen per watt, a luminance difference of 39.6 lumen (lm) exists between the two LED series exists, which affects the luminance consistency.

SUMMARY OF THE INVENTION

It is an object of the invention to provide a driving circuit, a driving method and a display apparatus. By controlling the using power of each light-emitting element series to be the same, the light emission of each light-emitting element series achieves higher consistency, thereby improving the screen luminance uniformity of the display apparatus.

In order to achieve the above object, the invention provides a driving method of a driving circuit for driving a light-emitting unit. The light-emitting unit includes a first light-emitting element series and a second light-emitting element series connected in parallel. The driving circuit includes a processing unit and a driving unit, which are communicatingly connected. The first light-emitting element series and the second light-emitting element series are both electrically connected to the processing unit and the driving unit. The driving method includes:

performing a step A, detecting a first voltage value at two ends of the first light-emitting element series and a second voltage value at two ends of the second light-emitting element series by the processing unit, and detecting a first current value flowing through the first light-emitting element series and a second current value flowing through the second light-emitting element series by the driving unit, and transmitting them to the processing unit;

performing a step B, determining a first power value according to the first current value and the first voltage value, and calculating a second power value according to the second current value and the second voltage value by the processing unit; and performing a step C, comparing the first power value and the second power value by the processing unit, wherein when the first power value is different from the second power value, the processing unit controls the driving unit to adjust a driving current setting corresponding to the second light-emitting element series or first light-emitting element series until the first power value is equal to the second power value.

In an embodiment, before the step A, the driving unit provides a first setting current value to the first light-emitting element series and provides a second setting current value to the second light-emitting element series.

In an embodiment, in the step C, when the first power value is larger than the second power value, the processing unit transmits a first signal to the driving unit.

In response to the first signal, the driving unit increases the second setting current value with one unit current value to update the second setting current value and provides the updated second setting current value to the second light-emitting element series and simultaneously provides the first setting current value unadjusted to the first light-emitting element series. The step A to the step C are repeated until the first power value is equal to the second power value.

Alternatively, in response to the first signal, the driving unit decreases the first setting current value with one unit current value to update the first setting current value and provides the updated first setting current value to the first light-emitting element series and simultaneously provides the second setting current value unadjusted to the second light-emitting element series. The step A to the step C are repeated until the first power value is equal to the second power value.

In addition, the invention also provides a driving circuit for driving a light-emitting unit. The light-emitting unit includes a first light-emitting element series and a second light-emitting element series connected in parallel. The driving circuit includes a processing unit and a driving unit. The processing unit is electrically connected to the first light-emitting element and the second light-emitting element. The driving unit is communicatingly connected to the processing unit, and the driving unit is electrically connected to the first light-emitting element series and the second light-emitting element series. The driving unit detects a first current value flowing through the first light-emitting element series and a second current value flowing through the second light-emitting element series, and transmits them to the processing unit. The processing unit detects a first voltage value at two ends of the first light-emitting element series and a second voltage value at two ends of the second light-emitting element series. The processing unit determines a first power value according to the first current value and the first voltage value and determines a second power value according to the second current value and the second voltage value. The processing unit compares the first power value and the second power value. When the first power value is different from the second power value, the processing unit controls the driving unit to adjust the driving current setting until the first power value is equal to the second power value.

In an embodiment, the driving unit is further configured to provide a first setting current value to the first light-emitting element series and a second setting current value to the second light-emitting element series before detecting.

In an embodiment, When the first power value is larger than the second power value, the processing unit transmits a first signal to the driving unit.

In response to the first signal, the driving unit increases the second setting current value with one unit current value to update the second current value and provides the updated second current value to the second light-emitting element series and the first setting current value unadjusted to the first light-emitting element series, simultaneously.

Alternatively, in response to the first signal, the driving unit decreases the first setting current value with one unit current value to update the first setting current value and provides the updated first setting current value to the first light-emitting element series and the second setting current value unadjusted to the second light-emitting element series, simultaneously.

In an embodiment, the first light-emitting element series has a first end and a second end in opposite, and the second light-emitting element series has a third end and a fourth end in opposite. The first end and the third end are connected. The first end, the second end, the third end and the fourth end are all electrically connected to the processing unit.

In an embodiment, the driving unit includes a first branch. The first light-emitting element series is connected to the first branch in series. The first branch has a first node. The first node is electrically connected to the driving unit.

In an embodiment, the light-emitting unit further includes a third light-emitting element series that is connected to the first light-emitting element series in parallel. The third light-emitting element is electrically connected to the processing unit and the driving unit. The driving unit further detects a third current value flowing through the third light-emitting element series. The processing unit further detects a third voltage value at two ends of the third light-emitting element series. The processing unit further determines a third power value according to the third current value and the third voltage value and compares the first power value and the third power value. When the first power value is larger than the third power value, the processing unit controls the driving unit to adjust the driving current setting of the third light-emitting element series until the third power value is equal to the first power value.

In addition, the invention also provides a display apparatus including the aforesaid driving circuit.

The driving circuit, the driving method and the display apparatus of the invention by utilizing the processing unit and the driving unit to detect the voltage value and the current value of each light-emitting element series and to determine and compare the using power of each light-emitting element series. When the using powers of the two light-emitting element series are different, one of the using powers is referred as a reference. For example, the current setting of the light-emitting element series with higher using power is not adjusted. For the light-emitting element series with lower using power, the processing unit controls the driving unit to increase the setting current value and again provide it to the corresponding light-emitting element series. By repeatedly detecting, calculating and comparing, each of the light-emitting element series is adjusted to achieve consistent using efficiency. Therefore, the luminance consistency between each light-emitting element series can be improved, and the screen luminance uniformity of the applied display apparatus can also be improved.

DETAILED DESCRIPTION OF THE PREFERRED EMBODIMENT

In order to further understand the object, structure, characteristic and function of the invention, hereinafter, the invention will be described in detail with reference to the embodiments.

Figure 2:
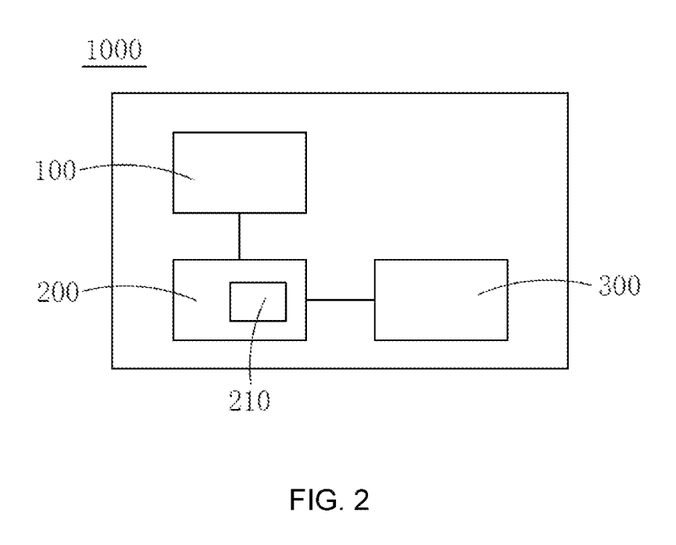
FIG. 2 is a schematic diagram of a display apparatus of the invention.

Referring to FIG. 2, FIG. 2 is a schematic diagram of a display apparatus of the invention. As shown in FIG. 2, a display apparatus 1000 includes a liquid crystal panel 100 and a backlight module 200. The backlight module 200 provides a backlight for the liquid crystal panel 100. Furthermore, the display apparatus 1000 further includes a driving circuit 300. The backlight module 200 includes a light-emitting unit 210, and the driving circuit 300 is configured to drive the light-emitting unit 210 to emit light.

Figure 3:
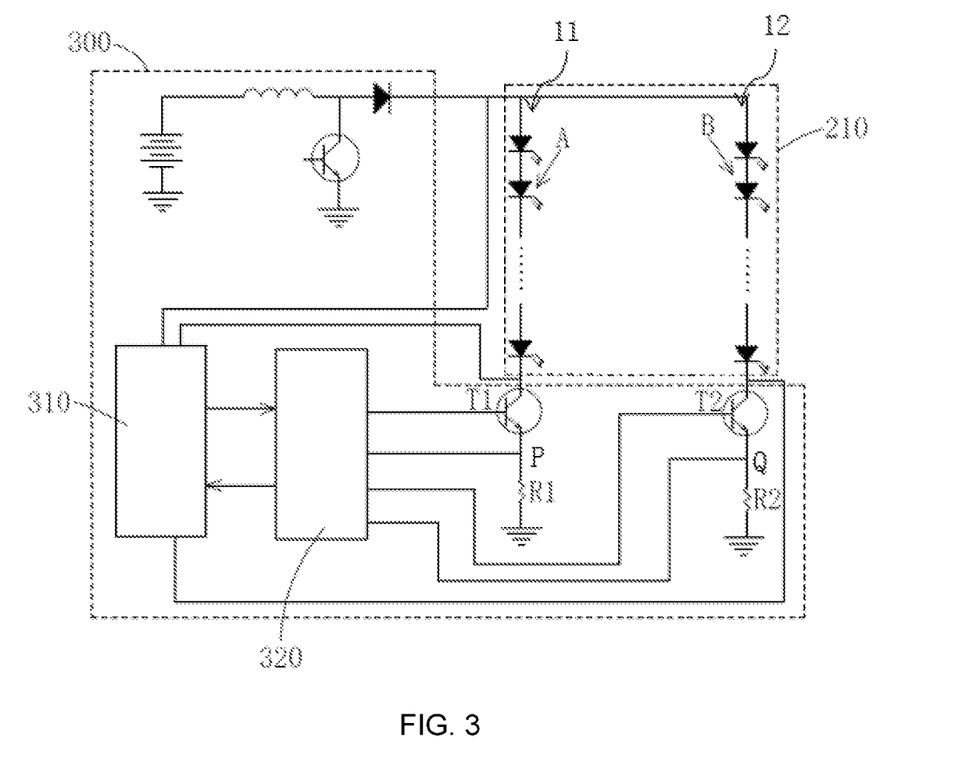
FIG. 3 is a schematic diagram of a driving circuit of the invention.

Referring to FIG. 3, FIG. 3 is a schematic diagram of a light-emitting element driving circuit of the invention. As shown in FIG. 3, the light-emitting element driving circuit 300 includes a processing unit 310 and a driving unit 320, which are communicatingly connected. The light-emitting unit 210 includes a first light-emitting element series A and a second light-emitting element series B, which are connected in parallel. The first light-emitting element series A and the second light-emitting element series B are both electrically connected to the processing unit 310 and the driving unit 320. During operation, the driving unit 320 detects a first current value flowing through the first light-emitting element series A and a second current value flowing through the second light-emitting element series B, and transmits the first current value and the second current value to the processing unit 310. The processing unit 310 detects a first voltage value at two ends of the first light-emitting element series A and a second voltage value at two ends of the second light-emitting element series B. The processing unit 310 determines the using power of the corresponding first light-emitting element series A, and defines as a first power value according to the first voltage value and the first current value (particularly, the product of the first voltage value and the first current value). The processing unit 310 determines the using power of the corresponding second light-emitting element series B, and defines as a second power value according to the second voltage value and the second current value (particularly, the product of the second voltage value and the second current value). The processing unit 310 compares the first power value and the second power value. When the first power value is different from the second power value, the processing unit 310 controls the driving unit 320 to adjust the driving current setting corresponding to the second light-emitting element series B until the first power value is equal to the second power value. When the second power value is equal to the first power value, the present driving current setting remains.

In practical operation, before detection, the driving unit 320 provides a first setting current value to the first light-emitting element series A and a second setting current value to the second light-emitting element series B. In an embodiment, the first setting current value and the second setting current value are initially the same, but not limited thereto in practical operation.

In an embodiment, when the processing unit determines that the first power value is larger than the second power value, the processing unit 310 transmits a first signal to the driving unit 320. The first signal can be a judgement result or a direct adjustment command, etc. In response to the first signal, the driving unit 320 increases the second setting current value with one unit current value corresponding to the second light-emitting element series B to update the second setting current value, and provides the updated second setting current value to the second light-emitting element series B. Simultaneously, the first setting current is not adjusted, and the driving unit 320 directly provides the first setting current value unadjusted to the first light-emitting element series A. The driving unit 320 again detects the first current value flowing through the first light-emitting element series A and the second current value flowing through the second light-emitting element series B, and transmits them to the processing unit 310. The processing unit 310 detects the first voltage value at two ends of the first light-emitting element series A and the second voltage value at two ends of the second light-emitting element series B. The processing unit 310 again determines the first power value according to the first current value and the first voltage value, which are latest detected. The processing unit 310 again determines the second power value according to the second current value and the second voltage value, which are latest detected. The processing unit 310 compares the first power value and the second power value. When the first power value is still larger than the second power value, the second setting current value is continued to be adjusted. The above steps are repeated again and again, until the first power value is equal to the second power value. In practical operation, when the second power value is larger than the first power value, the processing method is similar to the method that the first power value is larger than the second power value, and does not further elaborate herein.

In the previous embodiment, when the using power of each light-emitting element series is different, for the light-emitting element series with larger using power, the current setting is not adjusted. For the light-emitting element series with smaller using power, the processing unit 310 controls the driving unit 320 to increase the setting current value, and then the increased setting current value is provided again to the corresponding light-emitting element series. By repeating the processes of detecting, calculating and comparing, each light-emitting element series is finally adjusted to achieve a consistent using efficiency (e.g. consistent with the larger using power). Therefore, the luminance consistency of each light-emitting element series can be improved, and the screen luminance uniformity of the applied display apparatus can also be improved.

In another embodiment, when the processing unit 310 determines that the first power value is larger than the second power value, the processing unit 310 transmits the first signal to the driving unit 320. The first signal can be a judgement result or a direct adjustment command, etc. In response to the first signal, the driving unit 320 decreases the first setting current value with one unit current value corresponding to the first light-emitting element series A to update the first setting current value, and the driving unit 320 again provides the updated first setting current value to the first light-emitting element series A. Simultaneously, the driving unit 320 does not adjust the second setting current value and directly provides the second setting current value unadjusted to the second light-emitting element series B. The driving unit 320 again detects the first current value flowing through the first light-emitting element series A and the second current value flowing through the second light-emitting element series B, and transmits them to the processing unit 310. The processing unit 310 again detects the first voltage value at the two ends of the first light-emitting element series A and the second voltage value ate the two ends of the second light-emitting element series B. The processing unit 310 again determines the first power value according to the first current value and the first voltage value, which are latest detected, and again determines the second power value according to the second current value and the second voltage value, which are latest detected. By comparing the first power value and the second power value, when the first power value is still larger than the second power value, the first setting current value is continued to be adjusted. The above steps are repeated until the first power value is equal to the second power value. In the practical operation, when the second power value is larger than the first power value, the processing method is similar to the method that the first power value is larger than the second power value, and does not further elaborate herein.

In the embodiment, when the using power of each light-emitting element series is different, the current setting is not adjusted for the light-emitting element series with smaller using power. For the light-emitting element series with larger using power, the processing unit 310 controls the driving unit 320 to decrease the setting current value, and then the decreased setting current value is provided again to the corresponding light-emitting element series. By repeating the processes of detecting, calculating and comparing, each of the light-emitting element series is adjusted to achieve a consistent using efficiency (e.g. consistent with the smaller using power). Therefore, the luminance consistency of each light-emitting element series can be improved. The screen luminance uniformity of the applied display apparatus can also be improved.

In the embodiment, the first light-emitting series A and the second light-emitting series B both include a plurality of light-emitting elements connected in series. The light-emitting element is, for example, a light-emitting diode (LED) lighting, so that the first light-emitting element series A and the second light-emitting element series B are both LED lighting series.

In the invention, the processing unit 310 can be a micro-controller unit (MCU) in the display apparatus 1000, and the driving unit 320 can be a Driver integrated circuit (IC). In order to achieve the consistency of using powers between each of the light-emitting element series, in addition to the Driver IC, the MCU needs assistant operations including detection of electrical potentials of each end of the light-emitting element series, calculation and determination in combination with the current value transmitted from the Driver IC, and control of the adjustment of driving current setting for the Driver IC according to the determining result.

Generally, the luminance and using power of LED satisfies the equation: luminance=using power*light efficiency. The light efficiency of LED is generally fixed. However, the luminance of LED is proportional to the using power. In other words, the luminance consistency is decided by the consistency of using power. Furthermore, the equation is using power=current value*turn-on voltage, i.e., the using power includes two variables. If the method of merely controlling the current in the conventional technology is adopted, i.e., the current values flowing through different LED lighting series are the same, the using power of each LED lighting series will also have a difference because the difference in turn-on voltage exists between different LED lighting series. By simultaneously detecting and controlling the turn-on voltage value and the current value, the luminance consistency can be achieved. Based on above, the invention is different from the constant current mode in the conventional technology which abandons the control of the difference in turn-on voltage between different LED lighting series. The invention adopts a constant power mode to drive each of light-emitting element series, so as to ensure that the using power of each light-emitting element series is the same, and the luminance of each light-emitting element can obtain a higher consistency. Therefore, the screen luminance uniformity of display apparatus applied with the driving circuit can be also improved.

As shown in FIG. 3, in the invention, the first light-emitting element series A has a first end and a second end in opposite. The second light-emitting element series B has a third end and a fourth end in opposite. The first end and third end are connected. The first end, the second end, the third end and the fourth end are all electrically connected to the processing unit 310. When in use, the processing unit 310 detects the first end and third end to obtain a first electrical potential. The processing unit 310 detects the second end to obtain a second electrical potential, and detects the third end to obtain a third electrical potential. The first voltage value previously described is determined according to the first electrical potential and the second electrical potential. The second voltage value previously described is determined according to the first electrical potential and the third potential.

As shown in FIG. 3, the driving circuit 300 includes a first branch 11, and the first light-emitting element series A is electrically connected to the first branch 11 in series. In the embodiment, one end of the first branch 11 is the aforesaid first end. The other end of the first branch 11 is electrically connected to ground. The first branch 11 has a first node P. The first node P is electrically connected to the driving unit 320. The driving unit 320 detects the first current value flowing through the first light-emitting element series A by means of the first node P and transmits the detected first current value to the processing unit 310. As shown in FIG. 3, the driving circuit 300 further includes a second branch 12. The second light-emitting element series B is electrically connected to the second branch 12 in series. In the embodiment, one end of the second branch 12 is the previously described second end, and the other end of the second branch 12 is electrically connected to ground. The second branch 12 has a second node Q. The second node Q is electrically connected to the driving unit 320. The driving unit 320 detects the second current value flowing through the second light-emitting element series B by means of the second node Q and transmits the detected second current value to the processing unit 310.

As shown in FIG. 3, the first branch 11 further includes a first transistor T1 and a first resistor R1. In the embodiment, the first transistor T1 is a NPN type transistor. The first transistor T1 has a base electrode, a collector electrode and an emitter electrode. The base electrode of the first transistor T1 is electrically connected to the driving unit 320. The second end of the first light-emitting element series A is electrically connected to the collector electrode. The emitter electrode of the first transistor T1 is electrically connected to one end of the first resistor R1. The other end of the first resistor R1 is electrically connected to ground. The second branch 12 further includes a second transistor T2 and a second resistor R2. In the embodiment, the second transistor T2 is a NPN type transistor. The second transistor T2 has a base electrode, a collector electrode and an emitter electrode. The base electrode of the second transistor T2 is electrically connected to the driving unit 320. The fourth end of the second light-emitting element series B is electrically connected to the collector electrode of the second transistor T2. The emitter electrode of the second transistor T2 is electrically connected to one end of the second resistor R2. The other end of the second resistor R2 is electrically connected to ground. In practical operation, the aforesaid first node P is located between the emitter electrode of the first transistor T1 and the first resistor R1, for example. The aforesaid second node Q is located between the emitter electrode of the second transistor T2 and the second resistor R2, for example, but not limited thereto.

Figure 4:
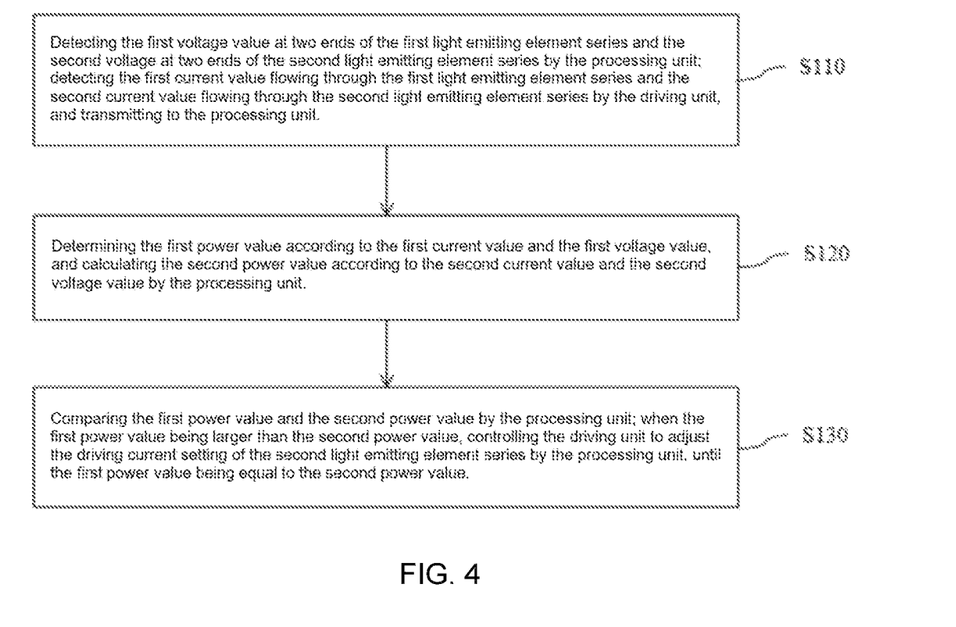
FIG. 4 is a schematic diagram of a driving method for the driving circuit of the invention.

Referring to FIG. 4, FIG. 4 is a schematic diagram of the driving method of the invention. The driving method of the invention is provided for driving the light-emitting unit. The light-emitting unit 210 includes the first light-emitting element series A and the second light-emitting element series B connected in parallel. The driving circuit 300 includes the processing unit 310 and the driving unit 320, which are communicatingly connected. The first light-emitting element series A and the second light-emitting element series B are both electrically connected to the processing unit 310 and the driving unit 310. The driving method includes:

Step A (S110), the processing unit 310 detects the first voltage value at two ends of the first light-emitting element series A and the second voltage value at two ends of the second light-emitting element series B. The driving circuit 320 detects the first current value flowing through the first light-emitting element series A and the second current value flowing through the second light-emitting element series B, and transmits them to the processing unit 310;

Step B (S120), the processing unit 310 calculates the first power value according to the first voltage value and the first current value, and calculates the second power value according to the second voltage value and the second current value; and Step C (S130), the processing unit 310 compares the first power value and the second power value. When the first power value is not equal to the second power value, the processing unit 310 controls the driving unit 320 to adjust the driving current setting corresponding to the second light-emitting element series B or the first light-emitting element series A until the first power value is equal to the second power value.

In practical operation, before the step A, the driving unit 320 provides a first setting current value to the first light-emitting element series A and a second setting current value to the second light-emitting element series B.

In one embodiment, in the step C, when the first power value is larger than the second power value, the processing unit 310 transmits a first signal to the driving unit 320. In response to the first signal, the driving unit increases the second setting current with one unit current value corresponding to the second light-emitting element series B to update the second setting current value, and provides the updated second setting current to the second light-emitting series B. Simultaneously, the first setting current value corresponding to the first light-emitting element series A is not adjusted, and the unadjusted first setting current value is provided to the first light-emitting element series A. The step A to the step C are repeated until the first power value is equal to the second power value. In practical operation, when the second power value is larger than the first power value, the processing method is similar to the method that the first power value is larger than the second power value, and not elaborate herein.

In another embodiment, in performing the step C, when the first power value is larger than the second power value, the processing unit 310 transmits the first signal to the driving unit 320. In response to the first signal, the driving unit 320 decreases the first setting current value with one unit current value corresponding to the first light-emitting element series to update the first setting current value, and provides the updated first setting current value to the first light-emitting element series A. Simultaneously, the second setting current value corresponding to the second light-emitting element series B is not adjusted, and the unadjusted second setting current value is provided to the second light-emitting element series B. The step A to the step C are repeated until the first power value is equal to the second power value. In practical operation, when the second power value is larger than the first power value, the processing method is similar to the method that the first power value is larger than the second power value, and not elaborate herein.

Figure 5:
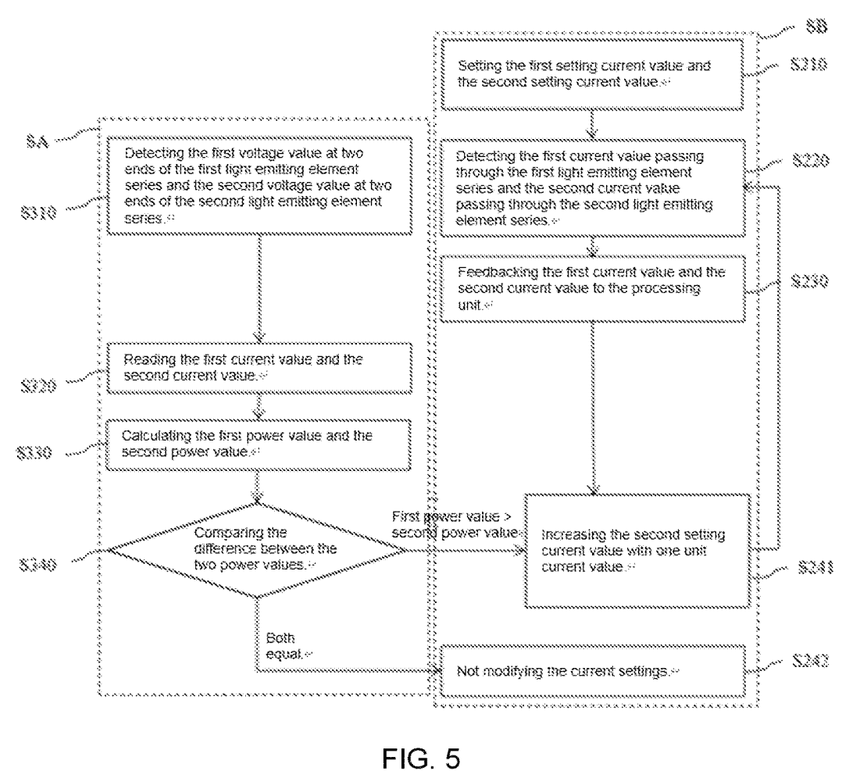
FIG. 5 is another schematic diagram of the driving method for the driving circuit of the invention.
Figure 6:
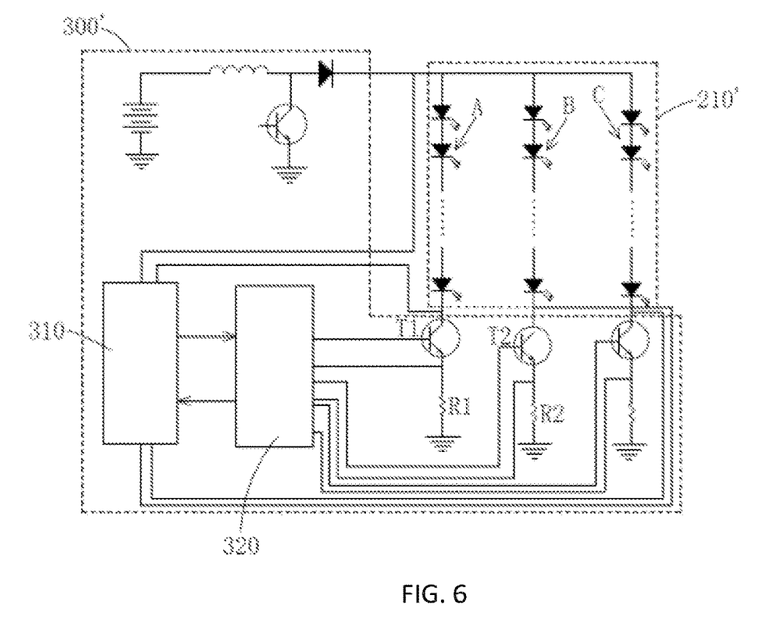
FIG. 6 is a schematic diagram of a light-emitting element driving circuit in another embodiment of the invention.

Referring to FIG. 5, FIG. 5 is a schematic diagram of the driving method in another embodiment of the invention. In the embodiment, a step group SA is performed by the processing unit 310. A step group SB is performed by the driving unit 320. The two step groups are cooperated to achieve the driving to the light-emitting unit 210.

The step group SB performed by the driving unit 320 includes:

Step S210, setting the first setting current value corresponding to the first light-emitting element series A and the second setting current value corresponding to the second light-emitting element series B, and correspondingly providing to the first light-emitting element series A and the second light-emitting element series B;

Step S220, detecting the first current value flowing through the first light-emitting element series A and the second current value flowing through the second light-emitting element series B;

Step S230, feedbacking the first current value and the second current value to the processing unit 310; and Step S241, increasing the second setting current value with one unit current value to update the second setting current value; or Step S242, not modifying the current setting.

The step group SA performed by the processing unit 310 includes:

Step S310, detecting the first voltage value at two ends of the first light-emitting element series A and the second voltage value at two ends of the second light-emitting element series B. Specifically, the first voltage value can be calculated by obtaining the electrical potentials at two ends of the first light-emitting element series A, and the second voltage value can be calculated by obtaining the electrical potentials at two ends of the second light-emitting element series B.

Step S320, obtaining the first current value and the second current value transmitted by the driving unit 320;

Step S330, determining the first power value according to the first voltage value and the first current value, and determining the second power value according to the second voltage value and the second current value. Specifically, the first power value can be determined according to the product of the first voltage value and the first current value, and the second power value can be determined according to the product of the second voltage value and the second current value; and Step S340, comparing the difference between the first power value and the second power value.

In the practical operation, the step S210 is firstly performed by the driving unit 320. During the step S220 performed by the driving unit 320, the processing unit 310 performs the step S310. After the step S230 is performed by the driving unit 320, the processing unit 310 performs the following step S320, step S330 and step S340. When the determination result is that the first power value is larger than the second power value, the processing unit 310 controls the driving unit 320 to increase the second setting current value with one unit current value to be an updated second setting current value and provides again to the second light-emitting element series B (S241). Simultaneously, the first setting current is not adjusted and is provided again to the first light-emitting element series A. When the first power value is equal to the second power value, the current setting is not modified (S242). When the first power value is smaller than the second power value, the processing method is similar to the method that the first power value is larger than the second power value, and not elaborate herein.

The invention provides the driving circuit 300 and the driving method. The voltage value and current value of each light-emitting element series are detected by the processing unit 310 and the driving unit 320, and the using power of each light-emitting element series is determined and compared. When each of the using powers is different, one of the using power is used as a reference. For example, the current setting for the light-emitting element series with larger using power is not adjusted. For the light-emitting element series with smaller using power, the processing unit 310 controls the driving unit 320 to increase the setting current value, and provides the increased setting current value to the corresponding light-emitting element series. Alternatively, the current setting for the light-emitting element series with smaller using power is not adjusted. For the light-emitting element series with larger using power, the processing unit 310 controls the driving unit 320 to decrease the setting current value, and provides again to the corresponding light-emitting element series. By repeating the processes of detecting, calculating, comparing, and adjusting, the using power of each light-emitting element series is finally adjusted to be the same. Therefore, the luminance uniformity of each light-emitting element series can be improved. Hence, the screen luminance uniformity of the applied display apparatus 1000 can also be improved. In practical operation, the light-emitting element series with larger using power is preferred to be an adjustment reference to improve using efficiency on the basis of satisfying the luminance uniformity.

For example, the operation of the driving circuit of the invention is described below. Assume that the driving unit 320 provides the first setting current value to the first light-emitting element series A and the second setting current value to the light-emitting element series B, the first setting current value and the second setting current value are equal, and both are 120 mA. The processing unit 310 detects the first electrical potential at the first end of the first light-emitting element series A and the third end of the second light-emitting element series B are 35.2V. The processing unit 350 detects the second electrical potential at the second end of the first light-emitting element series A is 0.2V. The processing unit 350 detects the third electrical potential at the fourth end of the second light-emitting element series B is 2.2V. Accordingly, based on the first electrical potential and the second electrical potential, the first voltage value at two ends of the first light-emitting element series A is determined to be 35.2-0.2=35V. Based on the first electrical potential and the third electrical potential, the second voltage value at two ends of the second light-emitting element series B is determined to be 35.2-2.2=33V. Simultaneously, the driving unit 320 detects the first current value flowing through the first light-emitting element series A is 120 mA by means of the first node P. The driving unit 320 detects the second current value flowing through the second light-emitting element series B is 120 mA by the second node Q.

Next, the processing unit 310 calculates the using power of the first light-emitting element series A to be the first voltage value*the first current value, and the first power value is P1=35*0.12=4.2 W. The processing unit 310 calculates the using power of the second light-emitting element series B to be the second voltage value*the second current value, and the second power value is P2=33*0.12=3.96 W.

Then, the processing unit 310 compares the first power value P1 and the second power value P2 and determines that the first power value P1 is larger than the second power value P2. The processing unit 310 transmits the first signal to the driving unit 320. In response to the first signal, the driving unit 320 adjusts the second setting current value corresponding to the second light-emitting element series B. Particularly, the driving unit 320 increases the second setting current value with one unit current value. Simultaneously, the driving unit 320 does not adjust the first setting current value corresponding to the first light-emitting element series A. The driving unit 320 provides the new second setting current value to the second light-emitting element series B, and provides the unadjusted first setting current value to the first light-emitting element series A. In this example, one unit current value is, for example, 0.5 mA, but not limited thereto in practical operation.

The driving unit 320 again detects the first current value flowing through the first light-emitting element series is 120 mA, and again detects the second current value flowing through the second light-emitting element series B is 120.5 mA. Simultaneously, the processing unit 310 again detects the first voltage at two ends of the first light-emitting element series A is 35V, and detects the second voltage value at two ends of the second light-emitting element series B is 33.14V. The processing unit 310 again calculates the using power of the first light-emitting element series A to be the first voltage value*the first current value, and the first power value is P1=35*0.12=4.2 W. The processing unit 310 calculates the using power of the second light-emitting element series B to be the second voltage value*the second current value, and the second power value is P2=33.14*0.1205=3.99 W.

The processing unit 310 again compares the first power value P1 and the second power value P2. The processing unit 310 determines that the power value P1 is larger the second power value P2, and again transmits the first signal to the driving unit 320. In response to the first signal, the driving unit 320 again increases the second current value with one unit current value corresponding to the second light-emitting element series B to update the second current value, and provides the updated second current value to the second light-emitting element series B. Simultaneously, the driving unit 320 does not adjust the first setting current value corresponding to the first light-emitting element series A, and again provides the unadjusted first setting current value to the first light-emitting element series A. The above processes are repeated again and again until the driving unit 320 detects that the first current value flowing through the first light-emitting element series A is 120 mA, and the second current value flowing through the second light-emitting element series B is 123.5 mA. The processing unit 310 detects the first voltage value at two ends of the first light-emitting element series A is 35V, and the second voltage value at two ends of the second light-emitting element series B is 34V. The processing unit 310 calculates the first power value of the first light-emitting element series A to be P1=35*0.12=4.2 W, and calculates second power value of the second light-emitting element series B to be P2=34*0.1235=4.2 W. At this time, the first power value P1=the second power value P2, and the adjustment is stopped. The driving unit 320 continuously uses the first setting current value and the second setting current value, which are currently updated, to correspondingly drive the first light-emitting element series A and the second light-emitting element series B.

In this example, during initial calculation, the using power of the first light-emitting element series A is 4.2 W, and the using power of the second light-emitting element series B is 3.96 W. The using power of the second light-emitting element series B is lower, and therefore the processing unit 310 controls the driving unit 320 to increase the second setting current value of the corresponding second light-emitting element series B, and provides to the second light-emitting element series B. At this time, in addition to increasing the second current value flowing through the second light-emitting element series B, the characteristic turn-on voltage of the second light-emitting element series B is also increased. When the second current value of the second light-emitting element series B is increased to 123.5 mA, the turn-on voltage of the second light-emitting element series B is also increased to 34V. The using efficiency of the second light-emitting element series B also achieves 34*0.1235=4.2 W. At this time, the second light-emitting element series B can achieve the same light luminance as the first light-emitting element series A. Furthermore, since the second voltage value at two ends of the second light-emitting element series B is increased from initial 33V to 34V, in the second branch 12, the voltage at two ends of the second resistor R2 electrically connected to the second light-emitting element series B in series is decreased from initial 2.2V to 1.2V. The power loss of the second resistor R2 can be decreased, and thus the using efficiency can be improved.

In the driving circuit and the driving method of the invention, when the first power value of the first light-emitting element series A is larger than the second power value of the second light-emitting element series B, which is connected in parallel with the first light-emitting element series A, the processing unit 310 transmits the first signal to the driving unit 320. For the second light-emitting element series B with smaller using power, the processing unit 310 controls the driving unit 320 to increase the second setting current value with one unit current value as the new setting current value, and the new setting current value is provided again to the corresponding light-emitting element series. For the first light-emitting element series with larger using power, the first setting current value is not adjusted and again provided to the first light-emitting element series A. The above processes are repeated until the first power value is equal to the second power value. At this time, the using powers of the first light-emitting element series A and the second light-emitting element series B are the same. Since the luminance is proportional to the using power, the luminances of the first light-emitting element series A and the second light-emitting element series B are the same. The luminance uniformity between different light-emitting element series can be improved, and thus the screen luminance uniformity of the display apparatus applied with the driving circuit can be ensured.

In the embodiment shown in FIG. 3, the light-emitting unit 210 includes two light-emitting element series connected in parallel, and the driving circuit 300 and the light-emitting unit 210 cooperated with each other. In practical operation, the amount of the light-emitting element series is not limited. Please refer to FIG. 5. FIG. 5 is a schematic diagram of the driving circuit in another embodiment of the invention. In the embodiment, light-emitting unit 210' further includes a third light-emitting element series C. The third light-emitting element series C, the first light-emitting element series A, and the second light-emitting element series B are connected in parallel. The third light-emitting element series C is electrically connected to the processing unit 310 and the driving unit 320. In the embodiment, the third light-emitting element series C is similar to the first light-emitting element series A and the second light-emitting element series B. The third light-emitting element series C includes a plurality of light-emitting elements connected in series. The light-emitting element is, for example, a LED lighting, and the third light element series is a LED lighting series.

During operation, the driving unit 320 provides the first setting current value to the first light-emitting element series A, the second setting current to the second light-emitting element series B, and the third setting current value to the third light-emitting element series C. The first setting current value, the second setting current value, and the third current value can be equal. The driving unit 320 detects the first current value flowing through the first light-emitting element series A, the second current value flowing through the second light-emitting element series B, and the third current value flowing through the third light-emitting element series C, and then transmits them to the processing unit 310. The processing unit 310 detects the first voltage value at two ends of the first light-emitting element series A, the second voltage value at two ends of the second light-emitting element series B, and the third voltage value at two ends of the third light-emitting element series C. The processing unit 310 determines the first power value corresponding to the first light-emitting element series A according to the first voltage value and the first current value, the second power value corresponding to the second light-emitting element series B according to the second voltage value and the second current value, and the third power value corresponding to the third light-emitting element series C according to the third voltage value and the third current value. The processing unit 310 compares the first power value, the second power value, and the third power value, and determines the largest value, such as the first power value. In other words, the power value of the first light-emitting element series A is the largest, and then the processing unit 310 transmits the first signal to the driving unit 320. In response to the first signal, the driving unit 320 does not adjust the corresponding first setting current value and provides it directly to the first light-emitting element series A, which has the largest power value. For the second light-emitting element series B with smaller using power, the driving unit 320 increases the second setting current value with one unit current value as the new second setting current value and provides it to the second light-emitting element series B. For the third light-emitting element series C with smaller using power, the driving unit 320 increases the third setting current value with one unit current value as the new third setting current value and provides it to the third light-emitting element series C. The processes of detecting, calculating and comparing are repeated, and the process of adjusting is stopped until the first power value, the second power value, and third power value are equal. The driving unit 320 continuously provides the first setting current value, the second setting current value and third setting current value, which are currently updated, to correspondingly drive the first light-emitting element series A, the second light-emitting element series B and the third light-emitting element series C. The detailed adjusting method can refer to the previous embodiments, and not elaborate herein.

In the driving circuit, the driving method, and the display apparatus of the invention, the processing unit and the driving unit detect the voltage value and current value of each light-emitting element series, and determine and compare the using power of each light-emitting element series. When the using powers are different, one of the using power is used as a reference. For example, the current setting for the light-emitting element series with larger using power is not adjusted. For the light-emitting element series with smaller using power, the processing unit controls the driving unit to increase the setting current and again provides it to the corresponding light-emitting element series. By repeating the processes of detecting, calculating and comparing, each light-emitting element series is finally adjusted to achieve uniform using efficiency. Hence, the luminance uniformity between each light-emitting element series can be improved. The screen luminance uniformity of the display apparatus applied with the driving circuit can also be improved.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A driving method for driving a light-emitting unit, the light-emitting unit comprising a first light-emitting element series and a second light-emitting element series connected in parallel, a driving circuit comprising a processing unit and a driving unit communicatingly connected, the first light-emitting element series and the second light-emitting element series both being electrically connected to the processing unit and the driving unit, the driving method comprising:

performing a step A, detecting a first voltage value at two ends of the first light-emitting element series and a second voltage value at two ends of the second light-emitting element series by the processing unit, and detecting a first current value flowing through the first light-emitting element series and a second current value flowing through the second light-emitting element series by the driving unit and transmitting the first current value and the second current value to the processing unit;

performing a step B, determining a first power value according to the first current value and the first voltage value, and calculating a second power value according to the second current value and the second voltage value by the processing unit; and performing a step C, comparing the first power value and the second power value by the processing unit, wherein when the first power value and the second power value are different, the processing unit controls the driving unit to adjust a driving current setting corresponding to the second light-emitting element series or the first light-emitting element series until the first power value is equal to the second power value.

2. The driving method of claim 1, wherein before the step A, the driving unit provides a first setting current value to the first light-emitting element series, and provides a second setting current value to the second light-emitting element series.

3. The driving method of claim 2, wherein in the step C, when the first power value is larger than the second power value, the processing unit transmits a first signal to the driving unit the driving unit increases the second setting current value with one unit current value according to the first signal to update the second setting current value, the driving unit provides the updated second setting current value to the second light-emitting element series and simultaneously provides the first setting current value unadjusted to the first light-emitting element series, the step A to the step C are repeated until the first power value is equal to the second power value.

4. A driving circuit for driving a light-emitting unit comprising a first light-emitting element series and a second light-emitting element series connected in parallel, the driving circuit comprising:
a processing unit, electrically connected to the first light-emitting element series and the second light-emitting element series; and
a driving unit, communicatingly connected to the processing unit, and electrically connected to the first light-emitting element series and the second light-emitting series,
wherein the driving unit detects a first current value flowing through the first light-emitting element series and a second current value flowing through the second light-emitting element series and transmits the first current value and the second current value to the processing unit; the processing unit detects a first voltage value at two ends of the first light-emitting element series and a second voltage value at two ends of the second light-emitting element series; the processing unit determines a first power value according to the first current value and the first voltage value and determines a second power value according to the second current value and the second voltage value; the processing unit compares the first power value and the second power value; when the first power value is different from the second power value, the processing unit controls the driving unit to adjust a driving current setting corresponding to the second light-emitting element series or the first light-emitting element series until the first power value is equal to the second power value.

5. The driving circuit of claim 4, wherein the driving unit is further configured to provide a first setting current value to the first light-emitting element series and a second setting current value to the second light element series before detecting.

6. The driving circuit of claim 5, wherein when the first power value is larger than the second power value, the processing unit transmits a first signal to the driving unit; in response to the first signal, the driving unit increases the second setting current value with one unit current value to update the second setting current value and provides the updated second setting current to the second light-emitting element series and simultaneously provides the first setting current value unadjusted to the first light-emitting element series.

7. A display apparatus, comprising the driving circuit of claim 6.

8. A display apparatus, comprising the driving circuit of claim 5.

9. The driving circuit of claim 4, wherein the first light-emitting element series has a first end and a second end in opposite; the second light-emitting element series has a third end and a fourth end in opposite; the first end and the third end are connected; the first end, the second end, the third end, and the fourth end are all electrically connected to the processing unit.

10. A display apparatus, comprising the driving circuit of claim 9.

11. The driving circuit of claim 4, wherein the driving circuit includes a first branch; the first light-emitting element series is connected to the first branch in series; the first branch has a first node, and the first node is electrically connected to the driving circuit.

12. A display apparatus, comprising the driving circuit of claim 11.

13. The driving circuit of claim 4, wherein light-emitting unit further comprises a third light-emitting element series connected to the first light-emitting series in parallel; the third light-emitting element series is electrically connected to the processing unit and the driving unit; the driving unit further detects a third current value flowing through the third emitting element series; the processing unit further detects a third voltage value at two ends of the third light-emitting element series; the processing unit further determines a third power value according to the third current value and the third voltage value and compares the first power value and the third power value; when the first power value is different from the third power value, the processing unit controls the driving unit to adjust a driving current setting corresponding to the third light-emitting element series until the third power value is equal to the first power value.

14. A display apparatus, comprising the driving circuit of claim 13.

15. A display apparatus, comprising the driving circuit of claim 4.

* * * * *